Nov. 25, 1969

H. W. HEIL 3,479,711

METHOD AND APPARATUS FOR PRODUCING A COLOR KINESCOPE AND BLANK UNIT THEREFOR

Filed Aug. 25, 1966

INVENTOR.
HANS W. HEIL
BY
ATTORNEY

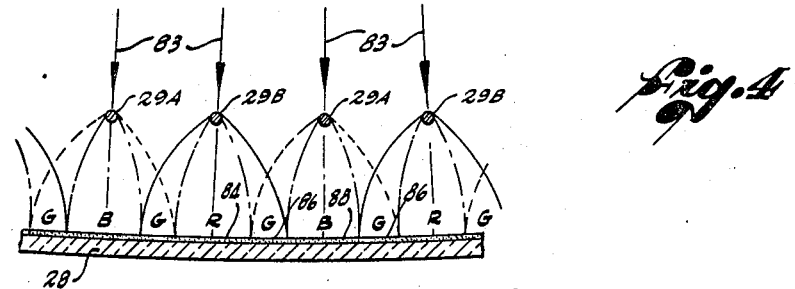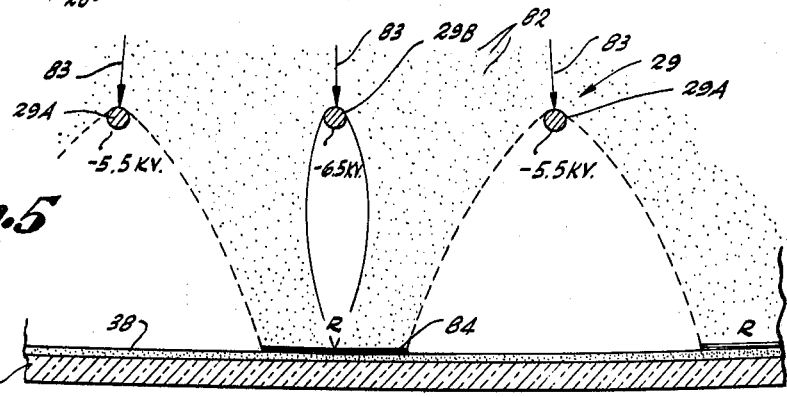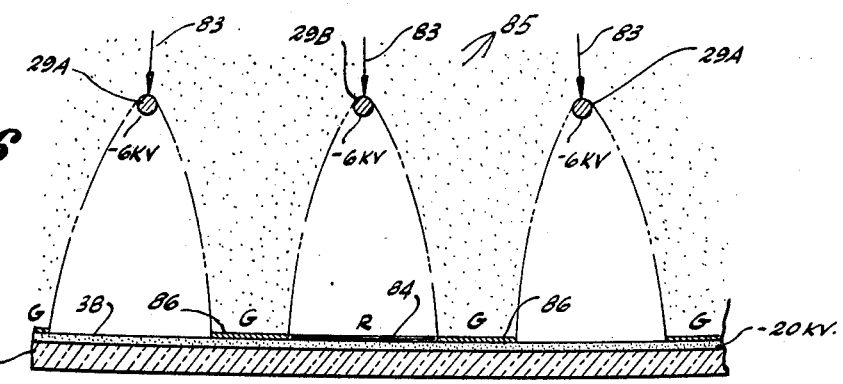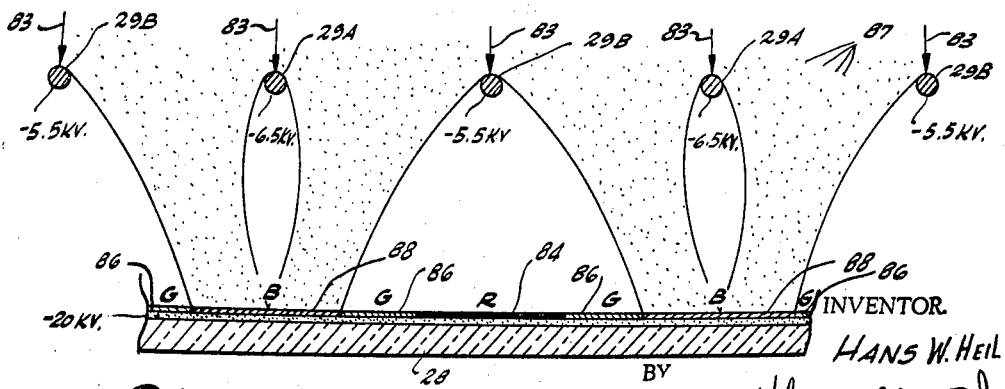

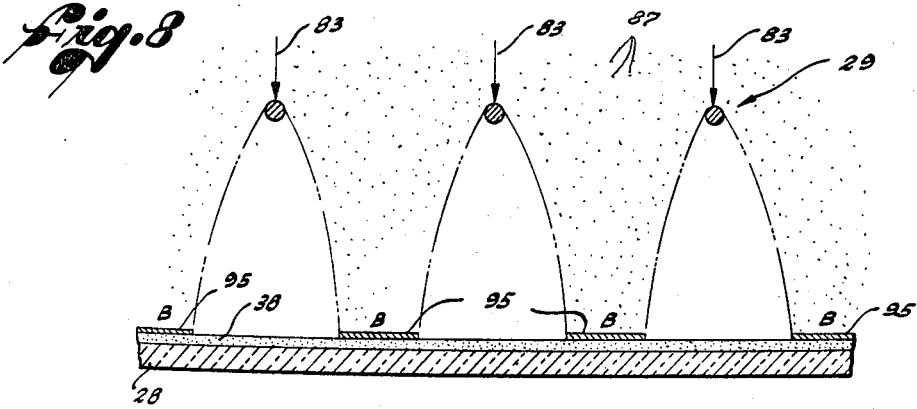
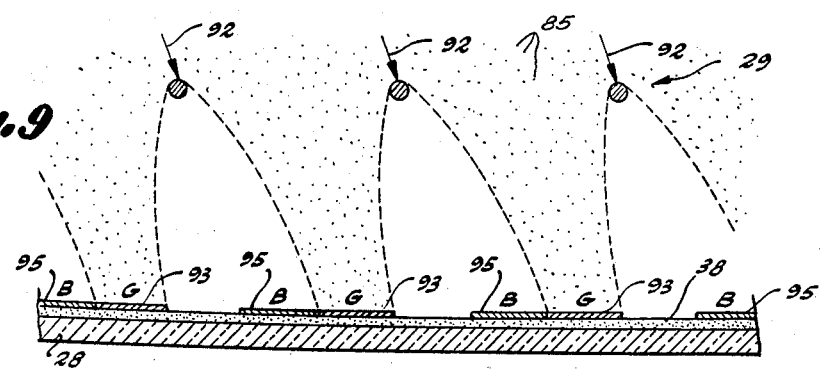
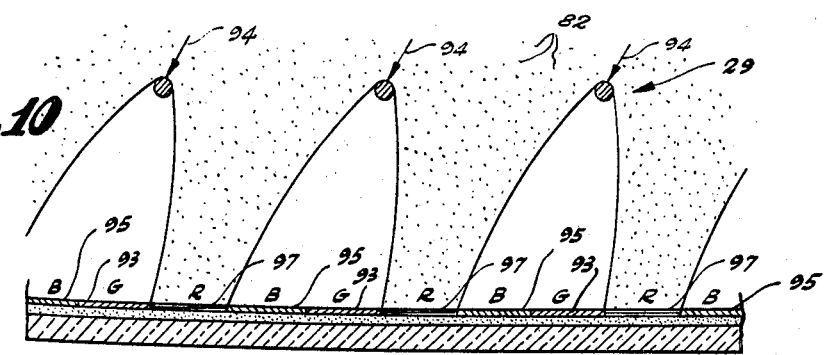
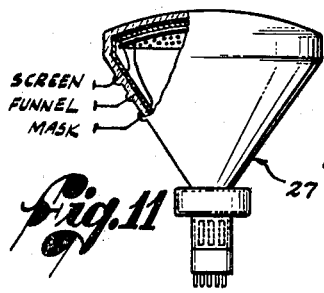
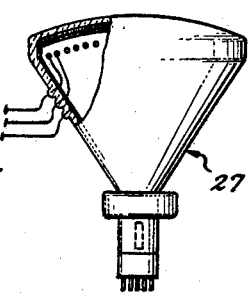
INVENTOR.
HANS W. HEIL

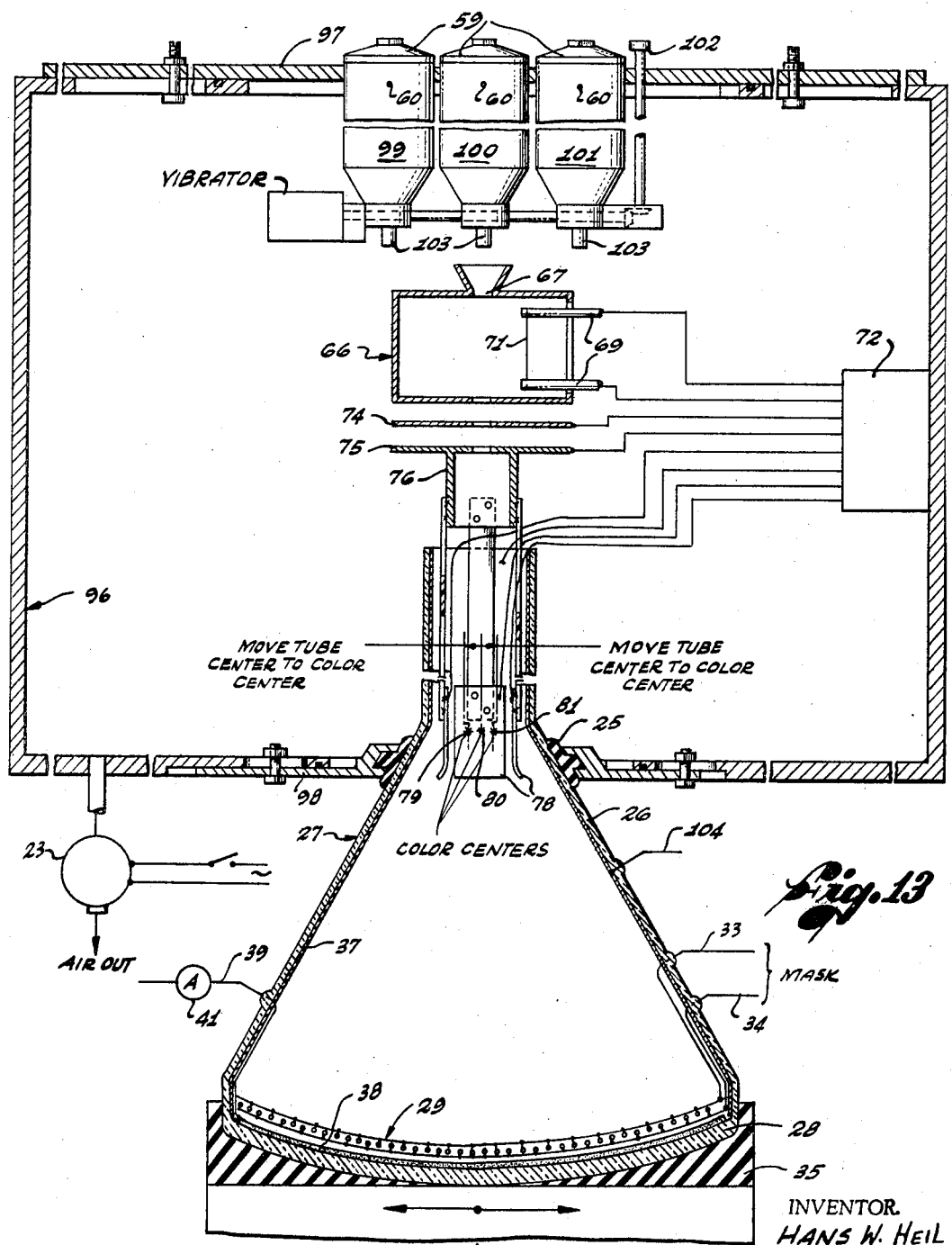

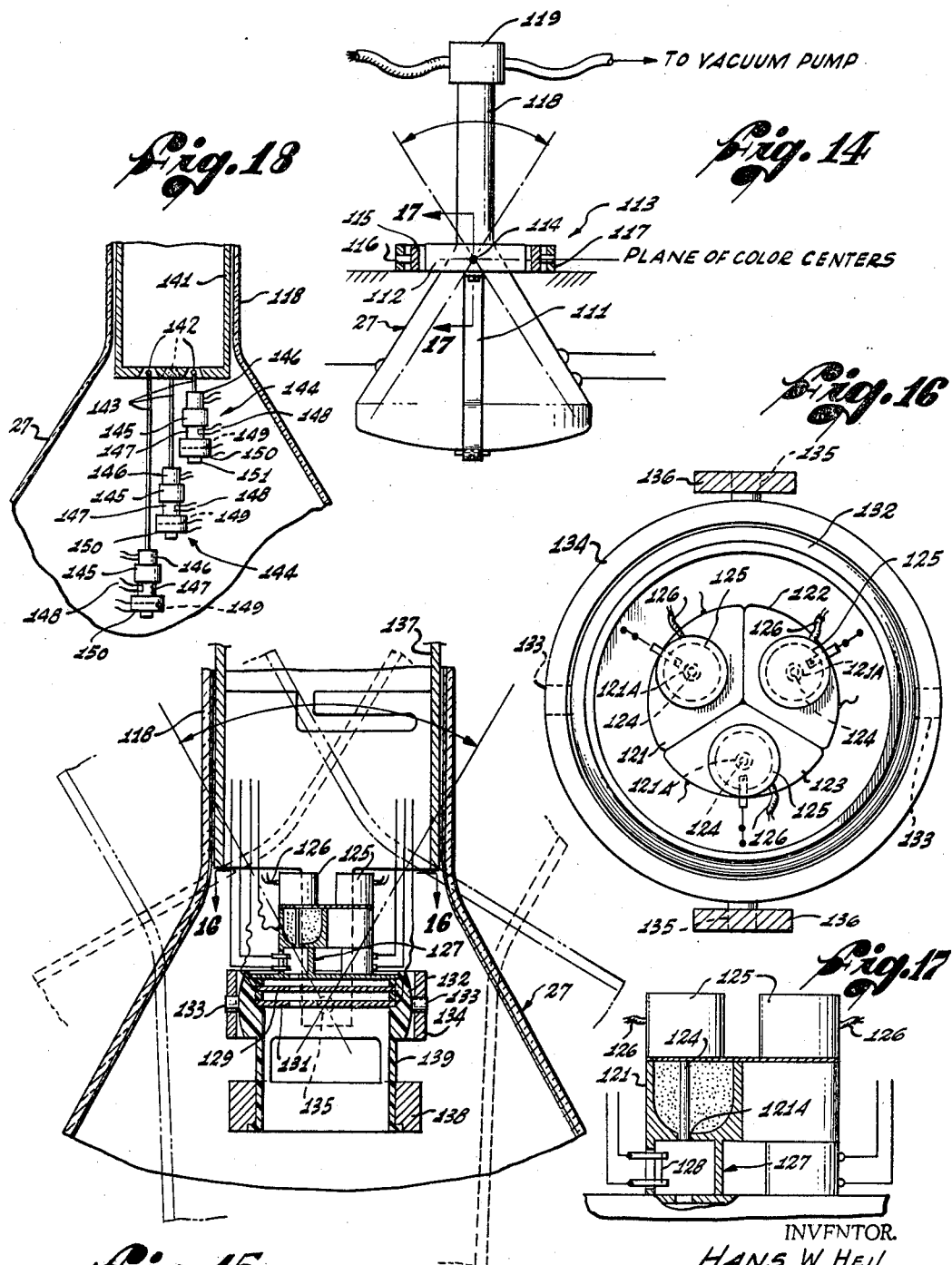

United States Patent Office 3,479,711
Patented Nov. 25, 1969

3,479,711
METHOD AND APPARATUS FOR PRODUCING A COLOR KINESCOPE AND BLANK UNIT THEREFOR
Hans W. Heil, Malibu, Calif., assignor to Hughes Aircraft Company, Culver City, Calif., a corporation of Delaware
Filed Aug. 25, 1966, Ser. No. 575,129
Int. Cl. H01j 9/18
U.S. Cl. 29—25.13                                14 Claims

ABSTRACT OF THE DISCLOSURE

Method and apparatus for forming phosphor patterns on the face plate of a cathode ray tube by electrically charging phosphor powder, forming it into a stream, and then scanning the face plate with the phosphor powder stream.

---

This invention relates to color cathode ray tubes or kinescopes, such as used in color television receivers, of the type employing color light-producing phosphors disposed in a repetitive or mosaic design and which in combination with a mask member permits the selection of the color phosphors to be impacted by a scanning cathode ray or electron beam.

More particularly, the present invention relates to a color cathode ray tube in which the front end of the tube, including the faceplate or viewing panel, the outwardly flared envelope or funnel portion of the tube, and the mask are permanently sealed together into a unit prior to the printing or depositing of the color phosphors on the viewing screen, and to a method and apparatus for depositing the color phosphors in the desired pattern on the viewing panel or screen without requiring disassembly of the tube faceplate or viewing screen, the funnel portion and mask unit.

Color cathode ray tubes or color kinescopes, particularly as utilized in color television receivers, include an image screen made up of a large number of phosphor groups of the colors red, blue and green in the form of lines or dots of sub-elemental image dimensions disposed on a glass substrate comprising the front viewing panel or faceplate of the tube. One kind of color kinescope has an image screen consisting of a large number of vertically or horizontally disposed strips or lines of different colored phosphor materials arranged in a sequence which may vary with the number of cathode ray guns used in the tube and with the widths of the different color phosphor lines. For example, in a three-gun kinescope the color phosphors may be formed in lines of equal width (10 mils wide, for example) in a repetitive sequence of: red-blue-green-red-blue-green . . .; in a single-gun kinescope one of the color phosphors, for example green, may be formed in lines only half the width but at twice the frequency of the other two color phosphors for use with a voltage switch mask or grid member to produce the desired focusing and deflecting of the electron beam. In this latter arrangement, the exampled green color phosphor lines can be 10 mils wide and the red and blue phosphor lines 20 mils wide and the arrangement of lines to be a repetition of: green-red-green-blue-green-red . . .

In another type of color kinescope the color phosphors are disposed in an array of triangularly disposed dots or triads of equal diameters, for example 10 mils. In this kinescope three guns are generally used to generate three electron beams and the mask in such a tube may comprise a uni-potential perforated plate having perforations equal in number to the number of triads of dots in the viewing screen.

For the strip or line disposition of the color phosphors the mask on the gun side of the viewing screen is usually in the form of a grid of wires parallel to the phosphor lines. The grid wires are maintained at a unipotential for the three-gun kinescope; in a single-gun kinescope alternate wires are connected together and insulated from the wires therebetween to permit voltage switching for directing the electron beam.

In all types of color kinescopes the different color-producing phosphor areas must be correctly and precisely arranged on the image-viewing screen in order to achieve color purity without distortion or color contamination when impacted by the scanning electron beam. The ability of such color tubes to produce true color image thus depends to a large extent upon the achievement of the correct size and proper geometric location of the different color-producing phosphor materials with respect to the path of scan of an electron beam or beams serving to selectively energize the different phosphor areas.

At the present time there are two main methods utilized for laying down or printing the different color-producing phosphor areas on the image or viewing screen. In one method the back of the faceplate panel of the tube is coated with a layer of a light-sensitive lacquer, resin or the like which desirably is partially conductive as by having a conductive filler incorporated therein. Light patterns corresponding to the desired color phosphor patterns are then employed to selectively or differently sensitize the desired areas of the viewing screen lacquer so that the different color-producing phosphor materials may be laid down in the desired pattern in accordance with the respective sensitization of given areas. This method requires several temporary assembly and disassembly operations of the viewing screen and the mask member. Final indexing of the mask with respect to the phosphor areas is difficult and time-consuming, requires extensive production facilities, and is a major source for rejects in the production process.

The second method presently utilized for printing the different color-producing phosphor areas on the viewing screen uses an electron beam sensitive coating for the gun side of the front panel of the tube and sensitizes different areas of the viewing screen coating to different extents by electron beams from an electron gun or guns similar to those to be permanently incorporated in the tube. Thereafter, with several covering, settling and washing steps, the different color phosphors are deposited on the viewing screen in the desired geometrical arrangement. In this method also, the front panel or viewing screen and mask must be temporarily assembled, disassembled and re-assembled in exact registry, and the deposition steps involved are lengthy, complicated and expensive.

The temporary assembly and disassembly required in both these methods of deposition not only makes the exact indexing of the mask, whether wire grid or perforated plate, with the image screen a difficult and critical task but also the assembly and disassembly requires repetitive evacuation of the tube envelope. These methods further require that a smoothing film or coating, usually of polymerized material, be deposited on the back face of the deposited color phosphors before the formation of a conventional metal (aluminum) surface thereon.

In the color cathode ray or television tube according to the present invention, the front panel or faceplate, the mask member and the funnel portion of the tube are permanently assembled together as a unit prior to the deposition of the color phosphors on the image screen or faceplate. In one example, a wire grid mask can have the individual wires thereof directly sealed into the tube wall and this front end assembly can be completed by the glass manufacturer. The phosphor screen printing and aluminizing operations are performed by the tube manufacturer without the necessity of disassembling the front panel and the grid, thus eliminating the difficulty of indexing the mask with the color phosphor geometry and further eliminating some of the evacuating operations.

Such a unit front assembly tube is possible because of the method of depositing the color phosphors and the apparatus therefor, according to the present invention. In the process of the invention, the surface of the viewing panel or faceplate is coated with a tacky substance which is at least slightly conductive and the different color phosphors are deposited thereon at exactly those positions where the electrons, which cause the color phosphors to luminesce, strike under normal tube operating conditions. To effect this, the individual phosphor particles are charged, accelerated and made to follow a trajectory in the evacuated tube identical to the one the electrons themselves follow. This is possible because the trajectory of a charged particle in an electric field is independent of the magnitude of the charge-to-mass ratio thereof.

In one method of depositing the phosphor particles according to the present invention, an electrostatic deflection system is used to cause the phosphor particle beam to scan the viewing panel or screen. It is not necessary to focus the particle beam; a flooding source at the position of the color center, which is the point of effective deflection, may be used. This method of deposition is particularly suitable for tubes employing focusing masks in order to direction-select the colors. Deposition of the color phosphor particles may be either parallel strips or triad dots with wire grid or perforated plate masks, respectively.

As will be described in detail hereinafter, instead of employing an electrostatic deflection system for scanning the phosphor particle beam and to distribute it across the viewing panel, the tube itself can be pivoted or swivelled, substantially about the color center, while the particle beam remains stationary. In this manner, all areas of the viewing panel may be brought beneath the particle beam.

Although the particle trajector is substantially independent of the charge-to-mass ratio, $Z/M$, the influence of gravitational force, if $Z/M$ is too small, and the danger of changing the state of charge on the particle during flight, if the charge is too high, set practical limits to the value of $Z/M$ which should be used. With Z expressing the charge on the particle in coulombs, C., and M the weight of the particle in kilograms, kg., a value of 0.01 C. kg.$^{-1}$ is indicated as a practical lower limit for the charge-to-mass ratio. With a negatively charged particle, the charge is deleteriously changed by field emission when the electric field at the surface is above $10^8$ volts per meter, which represents a practical upper limit for negatively charged particles and corresponds to a charge density of approximately $10^{-2}$ coulombs per square meter for particle sizes of $2^{-10}$ microns. This corresponds roughly to a $Z/M$ of 1 C. kg.$^{-1}$ for the upper limit.

A positive sign of charge is preferred for the phosphor particles to be deposited on the screen since the positive charge is not as readily lost by thermionic, field or photo emission. The upper limit for the field and $Z/M$ ratio of positively charged particles can be one or two orders of magnitude higher than for negatively charged particles. The sign of charge to be placed on the phosphor particles in the apparatus to be hereinafter described can be readily regulated by the electron energy of operation since it determines the secondary emission yield at the particle surface. Thus, the cathode potential for charging the particles is controlled so that secondary emission at the surface may be higher than unity if positively charged particles are desired, and less than unity if negatively charged particles are desired.

The charged phosphor particles are accelerated and pass in the evacuated tube through the color center of the particular color phosphor to be deposited. The beam of particles is either deflected between electrostatic plates, the potential across which is varied to secure universal swinging of the particle beam across the viewing panel, or the particle beam remains stationary and the tube and panel are bodily swivelled relative to the beam to effect the desired deposition. By deflection and focusing at the tube mask, the particles are placed in the desired geometrical position for each color phosphor on the image screen, as will be apparent hereinafter from the various apparatus embodiments and methods herein specifically illustrated and described.

An object of the present invention is the provision of a new and improved color kinescope in which the front end of the tube including the viewing panel, the funnel portion thereof and the mask are permanently joined together as a unit prior to the deposition of the color phosphors on the viewing panel.

Another object of this invention is to provide a new and improved article of manufacture comprising a viewing panel or faceplate, a tube funnel and mask as a permanently assembled unit without a phosphor image screen for incorporation and use in a color kinescope.

Another object of this invention is to provide a new and improved method of depositing color phosphors on the viewing panel of a color kinescope in which the individual phosphor particles are electrically charged, accelerated and made to follow trajectories onto the viewing panel substantially similar to the ones followed by the electrons in the normal operation of the kinescope.

A further object of this invention is to provide a new and improved method of depositing color phosphors on the viewing screen of a color kinescope in which the individual phosphor particles are electrically charged, accelerated and given flight trajectories substantially coincident with the ones the electrons follow in the normal operation of the kinescope, and in which the particle beam is scanned across the surface of the viewing panel by deflection between electrostatic plates, the voltage across which is caused to vary.

A still further object of the present invention is to provide a new and improved method of depositing color phosphors on the viewing panel of a color kinescope in which the phosphor particles are electrically charged, accelerated and caused to follow flight trajectories substantially coincident with the ones the electrons follow in normal kinescope operation, and in which a tube body portion is pivoted relative to a fixed position particle beam whereby the particles are deposited in the proper geometric pattern over and on the surface of the viewing panel.

Another object of this invention is the provision of new and improved apparatus for depositing color phosphors in a desired geometric pattern in a color kinescope by which the color phosphors are charged, accelerated and caused to follow trajectories in the tube substantially coincident with the trajectories the electrons follow in the normal operation of the kinescope, the particles being received and retained in a tacky, at least slightly conductive (electrically) film on the surface of the viewing panel.

Yet another object of the present invention is to provide an apparatus in accordance with immediately preceding object including an electrostatic deflection system disposed at the color centers of the tube for scanning the particle beam over the viewing panel.

Yet another object of the present invention is to provide an apparatus alternative to the immediately preceding apparatus in which the scanning of the particle beam is effected by bodily pivoting or swivelling the tube relative to the particle beam.

These and other objects and features of the invention will be readily apparent to those skilled in the art from the following specification and the appended drawings in which:

FIGURE 4 is a composite diagrammatic representation of the paths into which the charged phosphor particles may be focused and deflected by a switched wire-grid of a single-gun kinescope;

FIGURE 5 is a greatly enlarged view of the focusing and deflecting of one-color charged phosphor particles onto the image screen for one relative voltage switching of the wire grid of a single-gun kinescope;

FIGURE 6 is a view similar to FIGURE 5 showing the focusing of the charged phosphor particles of a different color with a uni-potential grid;

FIGURE 7 is a view similar to FIGURES 5 and 6 but showing the focusing and deflection of the third color phosphor particles with grid wire potential differences opposite to those of FIGURE 5;

FIGURE 8 is a view showing focusing of the particles of one of the color phosphors from the middle color center of a three-gun kinescope;

FIGURE 9 is a view similar to FIGURE 8 showing, greatly exaggerated, the focusing of particles of a second color from a side color center of a three-gun kinescope;

FIGURE 10 is a view similar to FIGURES 8 and 9 but showing, greatly exaggerated, the focusing of the particles of a third color from the color center at the side opposite to that of FIGURE 9;

FIGURE 11 is a diagrammatic representation of a color kinescope employing a triad dot image screen mosaic with a perforated shadow mask and three-gun electron beam sources;

FIGURE 12 is a dagrammatic representation of a single-gun color kinescope employing a switching wire-grid and a phosphor strip or line configuration;

Figure 1:
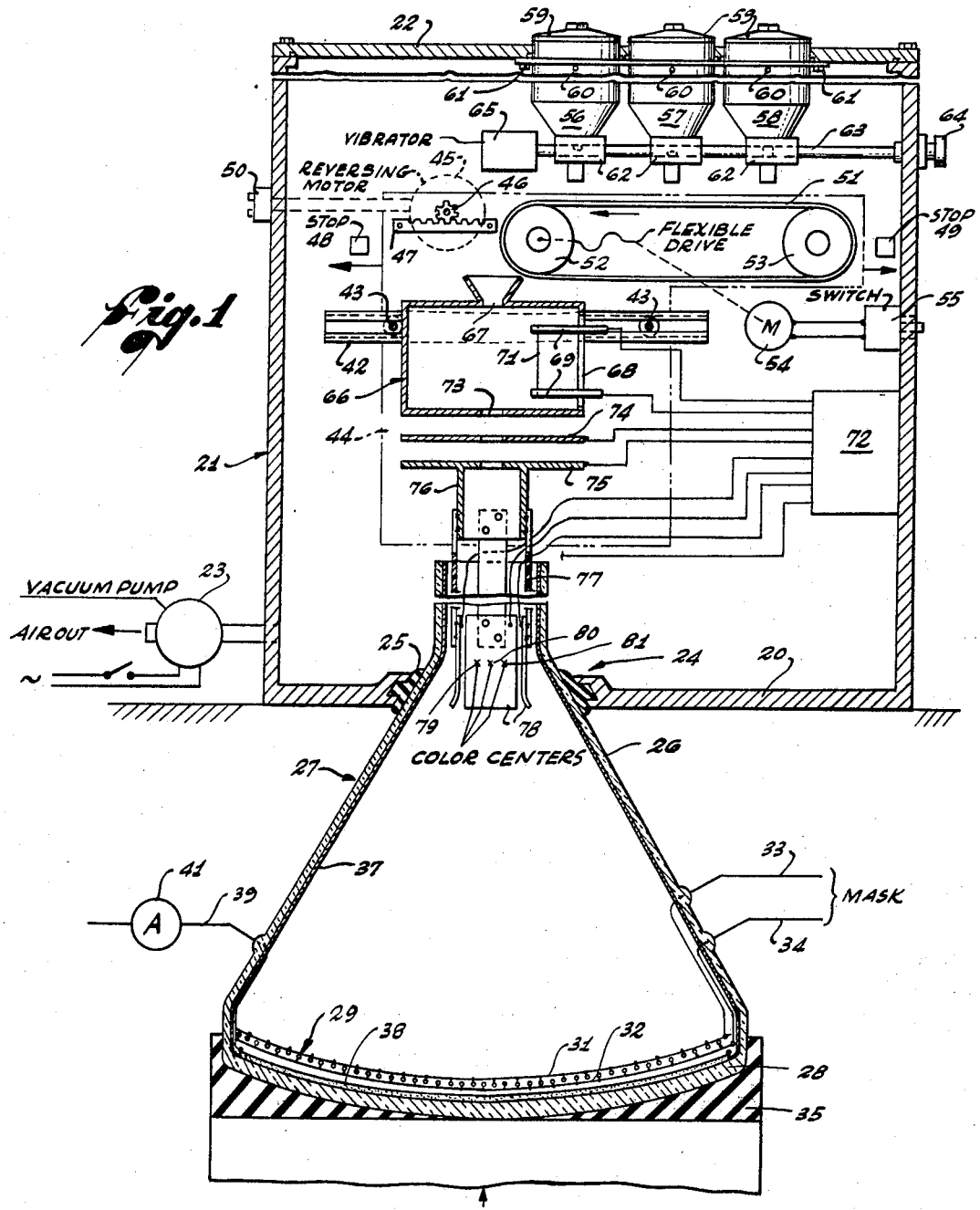
FIGURE 1 is a partially diagrammatic representation of an apparatus according to the present invention in which a beam of charged and accelerated phosphor particles is electrostatically deflected and which includes optional means for shifting the particle delivery elements into alignment with the different positions of the color centers of a multi-gun kinescope.

FIGURE 13 is a diagrammatic representation of an apparatus similar to FIGURE 1 but in which the particle delivery system may remain stationary while the tube is shifted to align the color centers with the axis of the particle beam in the case of a three-gun kinescope. This figure also illustrates shifting of the containers for the different color phosphors into alignment with the particle delivery system;

FIGURE 14 shows a gimbal mounting for a color kinescope tube by which the viewing panel is moved relative to a stationary phosphor particle beam;

FIGURE 15 is an enlarged, sectional view showing gimbal mounting of the phosphor charging, accelerating and delivery systems within the tube of FIGURE 14;

FIGURE 16 is a transverse, sectional view on the line 16—16 of FIGURE 15;

FIGURE 17 is an enlarged view of the phosphor supply and charging portion of FIGURE 15;

FIGURE 18 is a schematic representation of an alternate mounting for the phosphor charging, accelerating and delivery systems for the swivelling kinescope tube of FIGURE 14.

Referring to the embodiment of the present invention shown in FIGURE 1, there is provided a cabinet 21 having a sealable cover 22 and a vacuum pump 23 by which the cabinet enclosure may be evacuated. The bottom 20 of cabinet 21 has an opening 24 therein in which there is disposed a sealing ring 25 adapted for receiving the small end of the funnel portion 26 of a kinescope tube 27 in airtight relationship. The tube 27 is exteriorly supported on a base 35 which may be adjustable with respect to the cabinet 21.

The funnel portion 26, the faceplate or viewing panel 28, and the wire grid mask 29 of the tube 27 are permanently joined together as a unit precluding disassembly of the elements thereof. As previously stated, in the case of the wire grid mask shown in FIGURE 1, the individual wires may be individually sealed into the tube wall. In the case of a three-gun tube the wires of the grid 29 will be electrically connected together so as to be at the same potential. In the case of the single-gun tube, alternate wires are electrically connected together by base conductors 31 and 32 so that separate voltages may be switched to the alternate wires of the grid mask 29, as desired. For this purpose, separate insulated leads 33 and 34 may be brought into the tube, as shown in FIGURE 1. A universal tube unit may be provided initially as per the arrangement of FIGURE 1; the unit may be converted for use as a three-gun tube at any time merely by connecting the leads 33 and 34 together to a single potential source. The inside surface of the funnel portion 26 may be rendered conductive as by aluminizing as shown at 37 to duplicate operating conditions within the tube during the processing thereof according to the invention.

The inside surface of the faceplate or viewing panel 28 may be provided with a coating or film 38 which is initially tacky. The material of the film 38 should also be slightly conductive. A suitable material for this purpose is polyvinyl alcohol. A terminal 39 is connected to the coating 38 and may be optionally connected as well to the aluminum coating 37 on the funnel portion 26. Alternatively, the aluminum lining 37 on the funnel may be insulated from the faceplate coating 38 where the funnel conductive coating 37 is to be connected at grid or other potential. An ammeter at 41 may be provided for measuring the rate of deposition of the phosphor particles and if of integrating type will indicate the total amount deposited.

Rigidly mounted in the cabinet 21 are rails 42 within which are rollers 43 carried by and supporting a panel 44, shown in phantom in FIGURE 1. A reversing motor 45 is stationarily mounted in the cabinet to drive, through conventional speed reduction means, a gear 46 meshing with a rack 47 mounted on the panel 44. A reversing switch 50 controls rotation of motor 45 to cause the panel 44 to move slowly between the center position shown in FIGURE 1 and opposite side positions engaging the stops 48 and 49. The panel 44 carries a continuous feed belt 51 mounted between a pair of pulleys 52 and 53 and driven through a flexible drive by a motor 54 having a manual control switch at 55.

Aligned with feed belt 51 are containers 56, 57, and 58 individually serving as hoppers for the particles of the three color phosphors red, blue, and green. The containers 56–58 are supported at 61 on the bottom of the cover 22 and are provided with sealing covers 59 at the exterior of the cabinet and vent openings 60 interiorly thereof. At the bottom of each container is a valve 62 controlled by a common rod 63 having accurately spaced valve openings therethrough whereby the valves 62 may be individually opened or all closed to individually control the feed of the color phosphor particles. An exterior knob 64 controls the position of the valving rod 63. A vibrator 65 may be connected on the end of the rod 63 to insure regular feeding of the phosphor particles through the valves.

Rigidly secured on the panel 44 is a particle charging box 66 of conducting material having a top entrance opening 67 disposed beneath the feeding end of the belt 51. A sidewall of the charging box 66 is open at 68 to pass the terminals 69 of a hot wire cathode 71 fed from an electrical control and supply cabinet 72. The bottom wall of the charging box 66 has an opening 73 aligned with the opening 67 and beneath the charging box 66 is a three-electrode acceleration system formed of conducting plates 74 and 75 and a conducting tube shield 76 depending from the plate 75 and electrically connected thereto. Openings through the plates 74 and 75 index with the openings 67 and 73 and the axis of the tube 76, all the openings being substantially of the same size, for example of the order of 3 millimeters. From the tubular shield 76 depend insulating arms 77, four in number to support the four oppositely-facing or orthogonally disposed electrostatic deflection plates 78 which are disposed around color centers 79, 80, and 81, representing the effective deflection points for the electron beams.

The box 66 may, by way of example, be at substantially ground potential or slightly above ground potential of the order of +10 to +50 volts. The cathode 71 may have an exemplary potential of —3 kv. Assuming positively charged phosphor particles, the plate 74 may be, by way of example, at +50 volts, and the plate 75 and shield tube 76 at a potential of —20 kv. The potential applied to the conductive tacky film 38 may also be of the order of —20 kv. and the uni-potential or average potential applied to the grid 29 of the order of —6 kv. For switching the alternate wires of the single-gun grid, their potentials may be made more or less negative than the average by about 0.5 kv., between —5.5 kv. and 6.5 kv. The size of the phosphor particles to be deposited is not critical but should be quite small, for example of the order of 2–10 microns.

In the case of the single-gun kinescope, only the central color center 80 need be utilized and in this case the panel 44 remains in the central position shown in FIGURE 1 during deposition of all three color phosphors. Focusing and deflection of the different color phosphor particles may be effected by switching the potential of the alternate conductors of the grid 29, as will be explained hereinafter. In the case of the three-gun kinescope, three color centers 79, 80, and 81 are utilized and may be arranged either in a straight line at right angles to the stripes of a stripe phosphor color geometry or at the points of an equilateral triangle corresponding to the drop hole locations of FIGURE 16, in which case FIGURE 1 represents their projected positions. Triangularly arranged guns may be used with either the strip or triad dot color phosphor geometry as is well known in the art.

The voltages applied to the deflection plates 78 deflect the beam of charged particles and are varied to scan the beam across the surface of the faceplate 28 so that the color phosphors are deposited entirely thereover to form a phosphor viewing screen. The maximum voltage should produce just sufficient deflection to cause the particle stream to reach the edges of the panel and the rate of change of the voltage should be relatively slow compared to the rate of scan of an electron beam. The speed of scan and the rate of feed of the particles will determine the rate of deposition in the image screen.

The method of operation of the apparatus of FIGURE 1 will now be described. The unitary front end tube blank having the funnel, faceplate, and grid permanently sealed together as a unit has the inner surface of the funnel portion 26 aluminized as at 37 and the inner surface of the panel 28 coated at 38 with a tacky, at least slightly conductive, material such as polyvinyl alcohol or the like. The neck of the tube is inserted through the opening 24 by adjustment of the base support 35 and the tube is hermetically sealed to the cabinet by means of the ring 25. The cabinet is evacuated by the pump 23 and the proper voltages applied to the elements of the tube and apparatus of the exemplary values previously given.

To secure a positive charge on the phosphor particles, a current density of substantially the order of 2 $Am^{-2}$ may be desirable for a dwell time of the particles in the charging box 66 of the order of 50 milliseconds. This dwell time, T, depends on the depth of fall of the particles before entering the box and the height of the box between its upper and lower walls. The particles exit the opening 73 in an essentially slow fall, charged condition, are accelerated by the three electrode system 74–76, and are attracted to the tacky coating 38 by means of the negative potential thereon.

In operating the apparatus of FIGURE 1, the valve regulating knob 64 will be turned to open the proper valve 62 to secure the desired flow of phosphor particles and the vibrator 65 will be operated to maintain a substantially constant flow. The motor 54 is energized to drive the belt 51 and the phosphor particles dropping from the opened valve 62 are fed on the belt 51 through the opening 67 into the box 66 where they are charged positively by secondary emission due to bombardment thereof by electrons from cathode 71. The particles are then accelerated by the accelerating electrode system 74–76 to pass through the color center 80, in the position shown in FIGURE 1, and thence onto the tacky coating 38. The particle beam need not be focused but can flood the tacky surface with a diameter thereat of the order of ½"–4". The particle beam will be scanned across the surface of the viewing panel by suitably varying the voltages applied to the deflection plates 78, the particles thereby deflecting effectively at what will be the color center of the finished tube.

The operation for a single-gun kinescope employing voltage switching at the grid wires is illustrated in FIGURES 5–7 for a segment near the center of the viewing panel. FIGURE 5 illustrates the deposition of red phosphor particles between grid wires 29A, 29B, 29A . . . onto the tacky coating 38 on the glass substrate or faceplate 28. The wires 29A and 29B are 2–3 mils in diameter and are spaced on centers 30 mils apart. The wires 29A are switched to a potential of —5.5 kv. while the wires 29B are switched to a potential of —6.5 kv. Since the wires 29B are negative with respect to the wires 29A, deflection and focusing of the positive charge particles is achieved as shown in FIGURE 5. It will, of course, be understood that in the event negatively charged particles are used, the signs of all of the voltage values given for the screen, grid, and accelerating electrodes of the particle gun will be reversed. The charged particles in FIGURE 5 are indicated at 82 arriving in the direction of the arrows 83 at slightly different angles of approach to the plane of the grid depending on the distance displaced from the center of the tube. Under the grid voltage condition of FIGURE 5, the positive particles will be focused and deflected more from the grid conductors 29A and will be deposited on the tacky coating 38 to form a region of deposit constituting a 20-mil wide strip 84, for example.

The rate of deposition of the particles can be measured by a simple ammeter 41 since the rate of charge deposition in coulombs per second is, by definition, amperes. An integrating ammeter or coulombmeter will indicate the total charge deposited and therefore the total amount of phosphor particles which have reached the tacky material. From this the depth of deposit of the color phosphor may be determined and regulated. Alternatively, the deposited phosphor may be luminesced by an electron beam and the brightness measured by a photocell at the exterior of the tube to indicate the amount of phosphor deposited.

When the desired amount of the red phosphor has been uniformly deposited in strips 84 in the tacky coating 38, the supply of the red phosphor particles is cut off by the valve 62 therefor by means of the knob 64. In the case of the single-gun kinescope, for which the phosphor depositions are illustrated in FIGURES 4–7, the panel 44 remains in the central position shown in FIGURE 1 and all of the different color phosphor particles pass through the common color center 80. The knob 64 is now manipulated to open the valve 62 for the green phosphor particles and the conductors 29A, 29B are connected together to a common potential of —6 kv., as shown in FIGURE 6. The positively charged green particles at 85 approach from the same directions 83 and are focused by the uni-potential wires 29A, 29B into positions at opposite sides of the red strips 84, the green strips 86 being of 10 mils width, for example.

When the desired amount of green phosphor particles has been uniformly deposited to form the strips 86, the knob 64 closes the valve 62. The wires 29A, 29B are then switched to the reverse potential of FIGURE 5;

that is, the wires 29A are now maintained more negative (i.e., at —6.5 kv.) and the wires 29B are maintained less negative (i.e., —5.5 kv.). The valve 62 for the blue phosphor particles is now opened which are indicated at 87 in FIGURE 7 as again approaching in the direction of the arrows 83 and being both focused and deflected to be deposited in 20 mil strips 88 to complete the image screen geometry. When the desired amount of blue particles has been deposited, the tube 27 can be removed from the cabinet 21 for further processing.

The composite view of FIGURE 4 is made up from the individual deposits of FIGURES 5, 6, and 7 and does not therefore represent an actual operating condition since the phosphors will be individually deposited, and focused and deflected by the voltages on the grid wires individually into the positions indicated.

Figure 2:
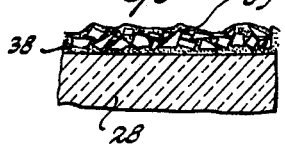
FIGURE 2 is a greatly enlarged representation of the viewing panel showing the tacky film and phosphor particles deposited thereon prior to aluminizing of the phosphor image screen.

FIGURE 2 shows, in a greatly enlarged view, the color phosphor particles deposited in the tacky coating 38 upon the panel substrate 28. Since the phosphor particles impact the coating 38 with considerable energy, they penetrate therein and the initial thickness of the coating 38 in such that at the termination of the phosphor deposit there is a thin film of the coating at 89 covering the phosphor particles, which film serves as a relatively smooth continuous base to receive an aluminum coating 91 evaporatively deposited thereon by known aluminizing techniques. After aluminizing the tacky material 38 may be removed by baking to leave the color phosphors in their geometric pattern between the thin aluminium film 91 and the viewing panel or faceplate 28 as an image screen to luminesce upon the impact of electrons thereon.

FIGURES 8–10 illustrate the deposition of the different color phosphors for a three-gun kinescope. In this type of kinescope all of the wires of the grid mask 29 are maintained at the same potential of —6 kv. in the example given. FIGURE 8, therefore, takes the same configuration af FIGURE 6 when the panel 44 is in the position shown in FIGURE 1 and the charged and accelerated blue phosphor particles pass through the central actual or projected color center 80. Blue phosphor particles are shown as being deposited at 87 in FIGURE 8 and are focused into 10 mil strips 95 for example. The positions which the strips assume relative to the grid wires will, of course, vary with the angles of approach of the particles, indicated by the arrows 83 in FIGURE 8 as being adjacent a central portion of the screen.

With the deposition of the blue phosphor particles completed, their supply is terminated at the appropriate valve 62 and the motor 50 is energized to shift the panel 44 to the left, as viewed in FIGURE 1. Upon engaging the stop 48, the panel 44 is positioned so that the axis of the particle path through the openings 67, 73, etc., passes through the color center 79 which corresponds in position to that of the green color gun of a three-gun kinescope. FIGURE 9 shows the green particles 85 approaching the wires of the grid 29 from a greatly exaggerated approach angle indicated by the arrows 92. The shifting between the color centers, a distance ordinarily of about one centimeter, produces at the grid mask a difference of angle of approach between the arrows 83 and 92 of substantially 2–3°. The particles 85 are now focused into a 10 mil green strip 93 alongside the blue strip 95.

At the termination of the deposit of the green phosphor particles, their supply is cut off and the motor 45 is energized to shift the panel 44 to the right, as viewed in FIGURE 1, until it engages stop 49 so that the axis of the particle beam now passes through the color center 81 corresponding to that of the red gun of the three-gun tube. The supply of red particles is now initiated and they approach the wires of the grid 29, in the screen portion under consideration, at a reverse angle of 2–3°, shown greatly exaggerated by the arrows 94 in FIGURE 10. The red particles 82 are focused into 10 mil strips 97 between the blue and green strips.

The structure of FIGURE 1 and the description of operation of FIGURES 8–10 apply equally to three-gun tubes whether the guns are in a straight line at right angles to the wires of the grid 29, or arranged at the tips of an equilateral triangle having a base at right angles to the wires of the grid. In the case of aligned guns, the axis of the particle beam is aligned with the color center. In the triangular gun grouping, the beam axis is aligned with the projection of the color center parallel to the grid wires. In the latter case, the offset of the axis of the particle beam and the color centers in the direction parallel to the wires of the grid is immaterial since it has no effect on the correct geometry of the strips.

FIGURE 11 shows a three-gun kinescope using a triad dot geometry and a perforated mask while FIGURE 12 shows a single-gun kinescope with a strip phosphor geometry and a wire grid. A three-gun electron source arranged either aligned or triangularly may be used in the geometry and grid configuration of FIGURE 12 but only the triangular, three-gun arrangement is usable in the triad dot and apertured mask kinescope of FIGURE 11. It will be understood that with a single-gun source in FIGURE 12 alternate wires of the grid mask must be insulated to permit voltage switching for both focusing and deflection of the electron beam. In all cases of a three-gun electron beam source the masks are at uni-potential. In the gun of FIGURE 11, the funnel lining has been given a separate terminal which may be connected either to the screen or to the mask, it being required that whichever connection is used for the phosphor particle deposit must also be used in the normal operation of the tube. In the tube of FIGURE 12, the aluminized screen and the aluminum lining for the funnel have been shown permanently connected within the tube. Either physical arrangement may be utilized in either tube.

FIGURE 13 illustrates an alternate apparatus according to the the present invention for carrying out the method in the tube of the invention. This apparatus also employs electrostatic deflection of the particle beam to scan the surface of the viewing panel. The charging box 66 and the particle guns 74–76 are stationarily mounted in this embodiment within a cabinet 96 having a shiftable cover portion 97 and a shiftable bottom portion 98. The sealing ring 25 for the kinescope tube 27 is mounted in the shiftable bottom portion 98 and the base support 35 for the tube is mounted to shift therewith, by means not shown, in the direction transverse to the wires of the grid 29. The color centers of their projections are located as before at 79, 80, and 81 and in the apparatus of FIGURE 13 the axis of the particle beam is aligned with the various color centers by shifting the tube 27 bodily with respect to the stationary charging and accelerating structure.

FIGURE 13 also illustrates another arrangement for the phosphor containers, here shown at 99, 100, and 101 mounted on the portion 97 of the cabinet cover and shiftable therewith to align the proper feeding funnel 103 with the opening 67 into the charging box 66. The phosphor containers have the same valve and vibrator feed controlled by an exterior knob 102. The other elements shown in FIGURE 13 are as previously described for FIGURE 1 except that the funnel lining 37 is insulated from the tacky conducting coating 38 and is given a separate terminal lead 104 so that it may be connected as desired. The cabinet 96 and tube 27 are again evacuated by the vacuum pump 23. The method of depositing the color phosphors with the apparatus of FIGURE 13 is exactly the same as that described for FIGURE 1, with the appropriate change in the steps by which the phosphors are fed to the opening 67 and the tube color centers are aligned with the axis of the phosphor particle beam rather than the reverse.

While both FIGURES 1 and 13 show kinescopes 27 having wire grid masks and the methods of operation have been described with respect to such a wire grid mask, these structures and the method of operation illustrated in FIGURES 8–10 are equally usable with the kinescope of FIGURE 11 employing the triangularly arranged three-gun source, a triad dot color mosaic, and a perforated mask. The particles of each color phosphor will be deposited through the apertures in the mask onto the proper geometric location of the dots of the particular color being deposited, the particles being focused by the uni-potential mask in accordance with the angular approach of the particles thereto. The charged particles will again take exactly the same trajectory onto the tacky, conductive coating 38 as is taken by the electrons in the normal operation of the tube.

With the aluminizing of the image screen as shown in FIGURE 2 to prevent shadowing by the mask, whether grid or perforated plate, several sources of aluminum vapor may be utilized spaced apart to insure that all areas of the image screen are covered.

FIGURES 14–18 illustrate, more or less digrammatically, structures according to present invention usable to effect relative scan between the phosphor particle beam and the viewing panel without deflecting the particle beam by the electrostatic plates. In these embodiments, relative movement between the beam and the viewing panel is secured by bodily pivoting or swivelling the kinescope tube in a gimbal for universal movement and at the same time mounting the phosphor particle sources and guns within the tube for universal swivelling, the swivelling point being coincident with the color centers.

The embodiments as specifically illustrated in FIGURES 14–18 are for three-gun kinescopes with either the parallel strip or triad dot geometric configuration of the color phosphors, as described hereinbefore. They may be adapted to produce screens for single-gun kinescopes with only simple modifications, as will be explained hereinafter.

As shown in FIGURE 14, the color kinescope tube 27 is mounted by an external strap 111 to the inner ring 112 of a gimbal mounting 113, the inner ring 112 being pivoted about an axis 114 in an intermediate ring 115 which is in turn pivoted about an axis 116, at right angles to the axis 114, in an outer stationary ring 117. The neck 118 of the kinescope tube 27 is connected by a vacuum coupling 119 and flexible tubing to a vacuum pump such as that shown at 23 in the previous embodiment. An electrical cable 120 leads through the coupling to the electrical leads within the tube.

With the tube 27 fixedly mounted in the inner ring 112 of the gimbal mounting 113, the color centers are offset from the center of swivel, as shown in FIGURE 16, but since there is only a small swivelling angle and the offset error involves the cosine of this small angle, the actual error in position and angle of approach becomes so small as to be negligible. For more precise location of the axis of the particle beam so that it may pass through the color center, an arrangement such as diagrammatically illustrated in FIGURE 18 may be used.

Referring now to FIGURES 15–17, the three color phosphors are mounted in three segmental hoppers 121, 122, and 123 having particle delivering openings 121A, 122A, and 123A leading downwardly therefrom and located at the tips of an equilateral triangle in coincidence with the color centers of triangularly located guns for a three-gun kinescope. In each of the hopper openings there is a pin 124 which substantially closes the opening from the hopper to prevent feed of the phosphor particles therefrom unless the pin 124 for that particular hopper is vibrated by a vibrator 125, individually controlled by its electric coil 126 so that only that phosphor will feed from a hopper 121–123 which has the vibrator 125 for its pin 124 energized.

Each opening 121A–123A leads into a charging box 127 conforming in function to the charging box 66 previously described and having therein a hot cathode wire 128 conforming to the cathode wire 71. The charging boxes 127 and cathode wires 128 are duplicated for each of the hoppers 121–123. Beneath the hoppers are mounted accelerating plates 129 and 131 insulated from the charging box and from each other, conforming in function to the plates 74 and 75 of the previously described embodiment and carrying similar accelerating potentials relative to the box potential. The bottoms of the charging boxes 127 and the plates 129 and 131 have openings therethrough aligning vertically with the holes 121A–123A in the hoppers and with the color centers.

The hoppers 121–123, the charging boxes, and the accelerating plates are all mounted in a gimbal ring 132 of insulating material pivoted at 133 in a second gimbal ring 134 which is in turn pivoted at 135 in a pair of straps 136 integral with a sleeve 137 suspended in the neck 118 of the kinescope tube 27 in any convenient mechanical manner, as from the coupling 119. A heavy pendulum ring 138 is suspended from the gimbal ring 132, as by legs 139, and the pendulum ring 138 functions in conjunction with the gimbal mounting to maintain the phosphor supplying, charging, and accelerating systems erect despite swivelling of the kinescope tube 27. The method of depositing the color phosphors using the apparatus of FIGURES 14–18 is substantially the same as that described in connection with FIGURES 8–10, the vibrators 125 being successively energized to deposit the respective color phoshpor particles in succession in the geometric pattern for the image screen provided for by the type of mask used in the tube. The coating 38 and mask have the exemplary potentials previously given and swivelling of the tube 27 and its viewing panel relative to the particle beam distributes the particles in the geometric pattern controlled by the mask over the panel surface in the coating 38. The swivelling provides a method of relative scan between the particle beam and the screen or panel without the necessity of electrostatically deflecting the particle stream.

Referring to FIGURE 18, the mounting therein shown provides for precise alignment of the axes of the particle beams with the color centers during swivelling of the tube which may be mounted as in FIGURE 14. A sleeve 141 suspended from the coupling 119 extends through the neck 118 of the tube and provides three suspension points 142 at exactly the location of the color centers in the finished kinescope. Suspended as pendulum weights by the cables 143 or the like from each suspension point 142 are particle supply units 144. Each unit 144 includes a hopper 145 like the hoppers 121–123 and including a similar vibrating pin feed controlled by a vibrator 146. A charging box 147 is located beneath each hopper and contains a particle charging cathode 148. Acceleration of the charged particles may be effected by an accelerating electrode system 149–151 like the accelerating system 74–76 of FIGURE 1. In this embodiment, as the tube 27 is swivelled, the phosphor particle units 144 stay in vertical alignment with the suspension points and color centers 142. The particle focusing is the same as previously described.

Since the hopper delivery openings 121A–123A are offset from the axis of the tube 27, none of them has the same geometry with respect to the tube as the color center of a single gun tube so that the embodiments of FIGURES 14–18 may not be used for a single-gun kinescope without modifications which are, however, simple and readily made. For example, the opening for phosphor delivery is made coincident with the axis of the tube at the color center thereof. In this arrangement only a single central hole need be provided for the plates 129, 131 of FIGURES 15–17 and a single central charging box 127 may be provided, as in FIGURES 1 and 13. The hoppers 121–123 for the three color phosphors may then be made shiftable relative to the charging box to index their outlets successively therewith. Alternatively, all three hoppers for the different color phosphors may be arranged in line with this line being parallel to the phosphor stripes. The fact that the color centers may be offset in this variation is of no effect on the location of the phosphor stripes.

Figure 3:
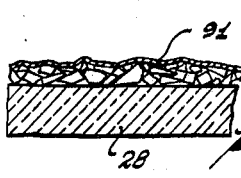
FIGURE 3 is a view similar to FIGURE 2 after aluminizing of the image screen.

Other features of the apparatus of FIGURES 1 and 13 which are not peculiar to the use of electrostatic deflection, such as the covering film 89 and aluminizing 91 of FIGURES 2 and 3, the measurement of the charge deposit or the brilliance of the deposited phosphor, etc., are equally adaptable to the tube swivelling modifications of FIGURES 14–18 and are to be considered incorporated therein although not specifically lilustrated.

While certain preferred embodiments, methods, and products have been specifically disclosed and described herein, it is understood that the invention is not limited thereto as many variations in each will be apparent to those skilled in the art and the invention is to be given its broadest interpretation within the terms of the following claims.

What is claimed is:

1. The method of manufacturing a viewing screen for a cathode ray tube comprising the steps of: directing a stream of electrically charged phosphor particles along a predetermined path to one discrete area at a time on a viewing screen member by effecting relative movement between said stream and said viewing screen member in a direction transverse to said predetermined path to cause said phosphor particles to be deposited thereon in a predetermined pattern.

2. The method according to claim 1 wherein said relative movement is achieved by scanning said stream of electrically charged phosphor particles across said viewing screen member.

3. The method according to claim 1 wherein said relative movement is achieved by moving said viewing screen member in a direction transverse to said predetermined path.

4. The method according to claim 2 wherein said stream of electrically charged phosphor particles is scanned across said viewing screen member by electrostatically deflecting said stream.

5. The method of manufacturing a viewing screen for a color cathode ray tube comprising the steps of: forming a stream of electrically charged phosphor particles capable of producing light of a first color and directing said stream to one discrete area at a time on said viewing screen member by scanning said viewing screen member with said stream to deposit said particles thereof on said viewing screen member according to a predetermined pattern; forming a second stream of electrically charged phosphor particles capable of producing light of a second color and directing said second stream to one discrete area at a time on said viewing screen member by scanning said viewing screen member with said second stream to deposit said particles thereof on said viewing screen member according to a predetermined pattern; and forming a third stream of electrically charged phosphor particles capable of producing light of a third color and directing said third stream to one discrete area at a time on said viewing screen member by scanning said viewing screen member with said third stream to deposit said particles thereof on said viewing screen member according to a predetermined pattern.

6. The method of manufacture according to claim 5 including the step of providing said viewing screen member with a slightly conductive tacky film.

7. The method of forming a phosphor screen on a substrate comprising the steps of:
  (a) electrically charging phosphor material;
  (b) forming a stream of said electrically charged phosphor material;
  (c) and directing said stream to one discrete area at a time on said substrate by electrostatically deflecting said stream across said substrate.

8. The method of producing a color kinescope comprising: coating the interior surface of the viewing panel of a kinescope tube with a tacky film of at least slightly conductive material; establishing a vacuum adjacent said interior surface of said panel; supplying a color phosphor in the form of a stream of small individual particles; electrically charging said phosphor particles; accelerating said charged particles toward said panel; and causing said particles to approach said panel and impinge said tacky film in trajectories substantially corresponding to the trajectories taken by electrons in normal operation of the finished kinescope by universally swivelling said viewing panel relative to the path of said particles to scan said stream thereof across the surface of said viewing panel, the swivelling axes intersecting substantially at the effective color center for the phosphor color being deposited.

9. The method of producing a color kinescope comprising: coating the interior surface of the viewing panel of a kinescope tube with a tacky film of at least slightly conductive material; providing a mask member adjacent said viewing panel in the position relative thereto it will occupy in the completed kinescope, said mask member being in the form of a grid of parallel wires; establishing a vacuum adjacent said interior surface of said panel; supplying a color phosphor in the form of a stream of small individual particles; electrically charging said phosphor particles; accelerating said charged particles toward said panel; applying potentials to said mask member and said conductive tacky film opposite in sign to the charge on said particles and having substantially the same differential therebetween as in the completed kinescope to secure the desired flight trajectories for said particles; and causing said particles to approach said panel and impinge said tacky film in trajectories, substantially corresponding to the trajectories taken by electrons in normal operation of the finished kinescope, the paths of the different color phosphor particles being in alignment with the effective color centers of the respective phosphor colors at least in directions parallel to the wires of said grid.

10. The method of producing a color kinescope comprising: coating the interior surface of the viewing panel of a kinescope tube with a tacky film of at least slightly conductive material; establishing a vacuum adjacent said interior surface of said panel; suspending individual sources of different color phosphor particles from the effective color center for the respective phosphor color so that the axis of discharge for the particles of each color passes through the effective color center therefor when said tube is tilted; supplying a color phosphor in the form of a stream of small individual particles by individually controlling the discharge of the particles of the different colors; electrically charging said phosphor particles; accelerating said charged particles toward said panel; and causing said particles to approach said panel and impinge said tacky film in trajectories substantially corresponding to the trajectories taken by electrons in normal operation of the finished kinescope by swivelling said tube during particle discharge to place the phosphor particles on the viewing screen in the desired pattern.

11. The method of producing a color kinescope comprising: coating the interior surface of the viewing panel of a kinescope tube with a tacky film of at least slightly conductive material; providing a mask member adjacent said viewing panel in the position relative thereto it will occupy in the completed kinescope; establishing a vacuum adjacent said interior surface of said panel; supplying a color phosphor in the form of a stream of small individual particles; electrically charging said phosphor particles; accelerating said charged particles toward said panel; applying potentials to said mask member and said conductive tacky film opposite in sign to the charge on said particles and having substantially the same differential therebetween as in the completed kinescope to secure the desired flight trajectories for said particles; and causing said particles to approach said panel and impinge said tacky film in trajectories substantially corresponding to the trajectories taken by electrons in normal operation of the finished kinescope.

12. The method according to claim 11 including the step of: deflecting said particle stream substantially at the effective final color center for the phosphor color being deposited to scan said particle stream across said surface of said viewing panel in a predetermined pattern.

13. The method defined in claim 11 including the step of: deflecting said particle beam by electrostatic fields and cyclically varying said electrostatic fields in a predetermined manner to scan said particle stream across said viewing panel in a predetermined pattern.

14. The method according to claim 11 wherein particles of different color phosphors are passed sequentially through substantially the effective color center position for the color being deposited.

References Cited

UNITED STATES PATENTS

| 2,446,440 | 8/1948 | Swedlund | 117—22 |
| 2,767,457 | 10/1956 | Eptein | 29—25 |
| 2,787,556 | 4/1957 | Haas | 117—17 XR |
| 2,844,758 | 7/1958 | Dow | 117—17 XR |
| 2,916,394 | 12/1959 | Rychlewski | 117—33 |

JOHN F. CAMPBELL, Primary Examiner

R. B. LAZARUS, Assistant Examiner

U.S. Cl. X.R.

29—25.11; 117—17, 33.5, 93.44